(12) United States Patent
Chang

(10) Patent No.: US 11,645,219 B2
(45) Date of Patent: May 9, 2023

(54) METHOD FOR GENERATING A HYBRID BMC SYSTEM AND HYBRID BMC SYSTEM

(71) Applicant: American Megatrends International, LLC, Norcross, GA (US)

(72) Inventor: Chih-Yin Chang, Taipei (TW)

(73) Assignee: AMERICAN MEGATRENDS INTERNATIONAL, LLC, Norcross, GA (US)

(*) Notice: Subject to any disclaimer, the term of this patent is extended or adjusted under 35 U.S.C. 154(b) by 201 days.

(21) Appl. No.: 17/165,605

(22) Filed: Feb. 2, 2021

(65) Prior Publication Data

US 2022/0245078 A1  Aug. 4, 2022

(51) Int. Cl.
*G06F 13/38* (2006.01)
*G06F 13/42* (2006.01)
*G06F 8/65* (2018.01)
*G06F 9/4401* (2018.01)
*G06F 11/30* (2006.01)

(52) U.S. Cl.
CPC .............. *G06F 13/385* (2013.01); *G06F 8/65* (2013.01); *G06F 9/4401* (2013.01); *G06F 11/3058* (2013.01); *G06F 13/4282* (2013.01)

(58) Field of Classification Search
CPC ........ G06F 13/385; G06F 8/65; G06F 9/4401; G06F 11/3058; G06F 13/4282
USPC .......................................................... 709/223
See application file for complete search history.

(56) References Cited

U.S. PATENT DOCUMENTS

2020/0099584 A1* 3/2020 Bhattacharyya .......... G06F 8/65
2020/0314115 A1* 10/2020 Nabeesa ............. H04L 63/1408

* cited by examiner

*Primary Examiner* — David R Lazaro
*Assistant Examiner* — Zia Khurshid
(74) *Attorney, Agent, or Firm* — Birch, Stewart, Kolasch & Birch, LLP

(57) ABSTRACT

A method for generating a hybrid BMC system and a hybrid BMC system are provided. The method includes: selecting, among a plurality of BMCs, one BMC to be a host BMC; selecting, among the plurality of BMCs, another BMC to be a client BMC, wherein the client BMC uses a first communication protocol different from a second communication protocol used by the host BMC, the client BMC being configured to perform a first task, and the host BMC being configured to perform a second task different from the first task; and configuring an adapter module of the host BMC to interface with the client BMC through the first communication protocol and interface with the host BMC through a second communication protocol such that the host BMC performs the first task through the adapter module.

10 Claims, 4 Drawing Sheets

METHOD FOR GENERATING A HYBRID BMC SYSTEM AND HYBRID BMC SYSTEM

FIELD OF THE INVENTION

The present invention relates to a BMC (baseboard management controller) system and method for generating a BMC system, and more particularly to a hybrid BMC system and method for generating the same.

BACKGROUND

Computing devices normally operate within a range of parameters, with the operation performance being monitored by sensors. The parameters being monitored may include, for example, temperature, humidity, power supply voltage, fan speed, etc. In prior art, a BMC (baseboard management controller) is often used to collect and analysis monitor data reported from sensors measuring the operation and performance of the computing device.

Due to the crucial role of the BMC in the management of hardware devices, the development of BMC solutions evolves quickly, and the proprietary BMC software available on the market is diverse. Apart from proprietary BMC solutions, there is also the trend to open source BMC solution. Therefore, a way to integrate multiple BMC solutions into one BMC system is desirable in this technical field.

SUMMARY

Accordingly, one of the objectives of the present invention is to provide a hybrid BMC (Baseboard Management Controller) system and a method for generating a hybrid BMC system that merges different functionalities from different BMC solutions into one BMC system.

In order to achieve the aforementioned objective, one embodiment of the present invention provides a method for generating a hybrid BMC system, the method including: selecting, among a plurality of BMCs, one BMC to be a host BMC; selecting, among the plurality of BMCs, another BMC to be a client BMC, wherein the client BMC uses a first communication protocol different from a second communication protocol used by the host BMC, the client BMC being configured to perform a first task, and the host BMC being configured to perform a second task different from the first task; and configuring an adapter module of the host BMC to interface with the client BMC through the first communication protocol and interface with the host BMC through a second communication protocol such that the host BMC performs the first task through the adapter module.

In one aspect of the present invention, the client BMC includes a first source code configured to perform the first task, and the host BMC includes a second source code configured to perform the second task, the method further comprising: obtaining, using the adapter module, the first source code from the client BMC; compiling, through the adapter module, the first source code; and installing, using the adapter module, compiled first source code on the host BMC.

In one aspect of the present invention, the step of compiling the first source code comprises: obtaining, using the adapter module, a compilation information from the client BMC; and using an emulated toolchain according to the compilation information of the client BMC to compile the first source code, wherein the emulated toolchain includes programming tools provided by the host BMC.

In one aspect of the present invention, the method further comprises: compiling, using a native toolchain of the host BMC, the second source code; and generating, using the host BMC, a BMC image file including compiled first source code and compiled second source code.

In one aspect of the present invention, the method further comprises: obtaining, using the adapter module, a runtime information associated with the first task from the client BMC; and configuring, using the adapter module, an emulated runtime environment according to the runtime information on the host BMC for the compiled first source code to be executed in.

In one aspect of the present invention, the method further comprises: compiling, using a native toolchain of the host BMC, the second source code; generating, using the host BMC, a BMC image file including compiled first source code and compiled second source code; and executing the BMC image file on the host BMC to perform the first task and the second task, wherein the compiled first source code is executed on the emulated runtime environment, and the compiled second source code is executed on a native runtime environment of the host BMC.

Another embodiment of the present invention provides a hybrid BMC system comprising a host BMC and an adapter module of the host BMC. The host BMC includes a second source code configured to perform a second task. The adapter module of the host BMC includes a first source code of a client BMC configured to perform a first task, wherein the adapter module is configured to interface with the client BMC through a first communication protocol and interfacing with the host BMC through a second communication protocol such that the host BMC performs the first task through the adapter module.

In one aspect of the present invention, the adapter module is configured to compile the first source code using an emulated toolchain according to a compilation information obtained from the client BMC, the emulated toolchain including programming tools of the host BMC.

In one aspect of the present invention, the hybrid BMC system further comprises an emulated runtime environment for the compiled first source code to be executed in, the emulated runtime environment being configured by the adapter module according to a runtime information associated with the first task obtained from the client BMC.

In one aspect of the present invention, the hybrid BMC system further comprises a BMC image file including compiled first source code and compiled second source code, wherein the compiled second source code is compiled by a native toolchain of the host BMC.

In order to further the understanding of the present disclosure, reference is made to the following detailed description illustrating the embodiments and examples of the present disclosure. The description is for illustrative purpose only and is not intended to limit the scope of the claim.

DETAILED DESCRIPTION OF EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

First Embodiment

Figure 1:
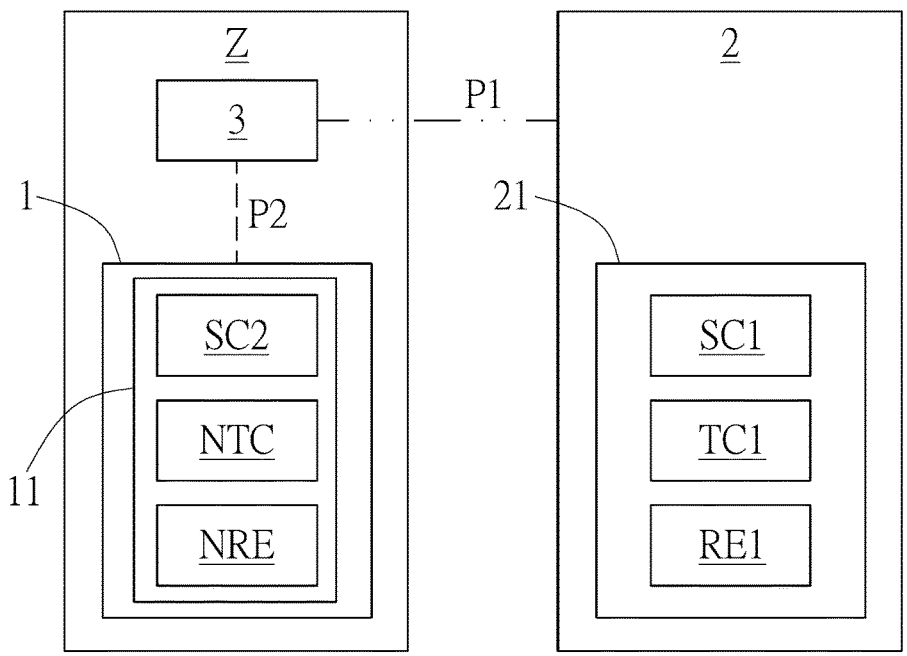
FIG. 1 is a functional block diagram illustrating a hybrid BMC system according to a first embodiment of the present invention.
Figure 2:
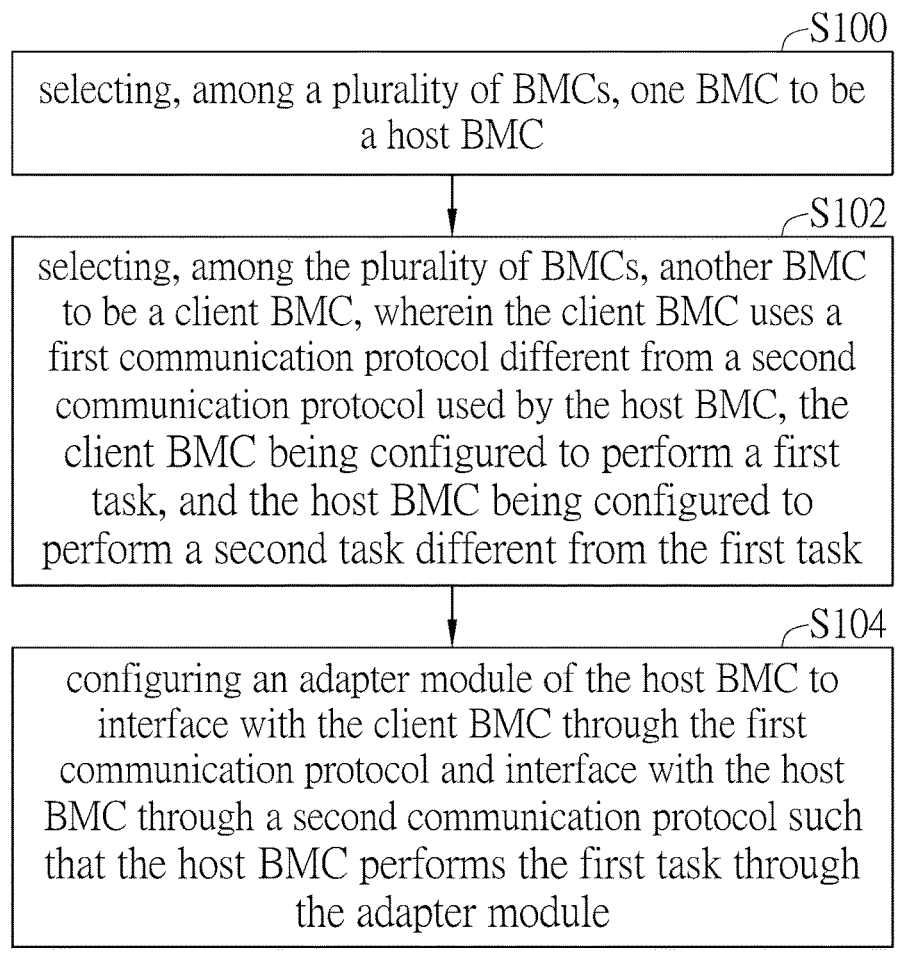
FIG. 2 is a flow chart illustrating a method for generating a hybrid BMC system according to the first embodiment of the present invention.

Below a first embodiment of the present invention is described with reference to FIG. 1 and FIG. 2, wherein FIG. 1 shows a hybrid BMC (baseboard management controller) system Z provided by the first embodiment and FIG. 2 illustrates a method for generating the hybrid BMC system Z of FIG. 1.

Referring to FIG. 2, in the present embodiment, the method for generating a hybrid BMC system includes step S100: selecting, among a plurality of BMCs, one BMC to be a host BMC 1; step S102: selecting, among the plurality of BMCs, another BMC to be a client BMC 2, wherein the client BMC 2 uses a first communication protocol P1 different from a second communication protocol P2 used by the host BMC 1, the client BMC 2 being configured to perform a first task, and the host BMC 1 being configured to perform a second task different from the first task; and step S104: configuring an adapter module 3 of the host BMC 1 to interface with the client BMC 2 through the first communication protocol P1 and interface with the host BMC 1 through a second communication protocol P2 such that the host BMC 1 performs the first task through the adapter module.

FIG. 1 shows the hybrid BMC system Z including the selected host BMC 1 and client BMC 2 according to step S100 and step S102. The present invention is not limited to the criterion used to choose the host BMC and the client BMC. Preferably, in one embodiment, the BMC with the most desirable features, i.e. the tasks that the BMC is capable of performing, is chosen to be the host BMC. In the present embodiment, the client BMC 2 is configured to perform a first task that the host BMC 1 itself is not configured to perform. In other words, the client BMC 2 has at least one desirable functionality that the host BMC does not have, i.e. the first task in the present embodiment. More specifically, in the present embodiment, the client BMC 2 uses a first communication protocol that is different from a second communication protocol used by the host BMC 1.

In the present embodiment, the hybrid BMC system Z further includes an adapter module 3. In step S104, the adapter module 3 is configured to interface with the client BMC 2 using the first communication protocol P1, and interface with the host BMC 1 using the second communication protocol P2. For example, the client BMC 2 includes a first task module 21 including a first source code SC1 configured to perform the first task, a first toolchain 1 and a runtime environment RE1 for the first source code SC1 to be compiled and executed in respectively; the host BMC 1 includes a second task module 11 including a second source code SC2 configured to perform the second task, a native toolchain NTC and a native runtime environment NRE for the second source code SC2 to be compiled and executed in respectively. Since the host BMC 1 and the client BMC 2 uses different communication protocol, in the prior art it might take a lot of efforts and time to rewrite one of the first task module 21 and the second task module 11 so that the first task and the second task can be performed by one BMC, e.g. the host BMC 1. In the present invention, the hybrid BMC system Z includes the adapter module 3 that communicates with the client BMC 2 through the first communication protocol P1, and communicate with the host BMC 2 through the second communication protocol P2, allowing the host BMC 1 to access the first task module 21 and perform the first task through the adapter module 3, thereby achieving a hybrid BMC system Z with hybrid functionality, that is, the function of the host BMC 1 plus the function of the client BMC 2 in the present embodiment.

This way, the present embodiment allows the hybrid BMC system Z to integrate multiple functionalities from different BMC solutions. It should be noted that the BMC solutions can be either proprietary BMC or open source BMC; the present invention is not limited thereto. That is to say, the first source code SC1 and the second source code SC2 can be proprietary BMC code or open source BMC code.

Second Embodiment

Figure 3:
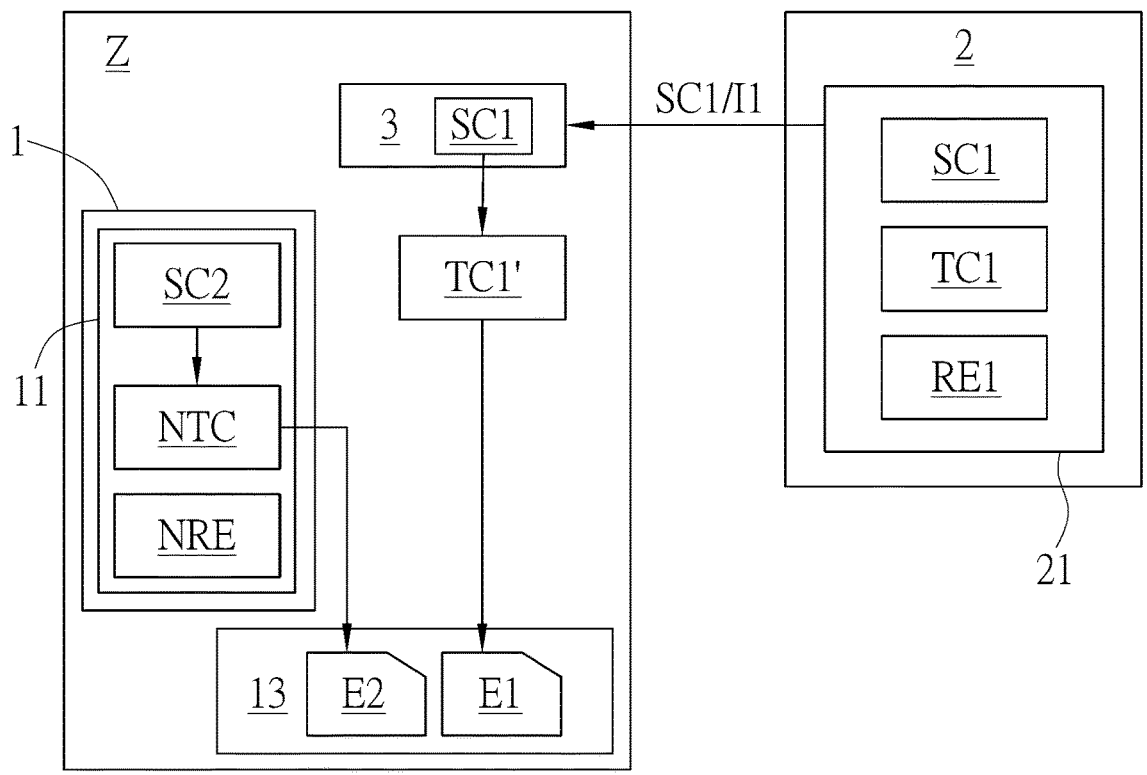
FIG. 3 is a functional block diagram illustrating a hybrid BMC system according to a second embodiment of the present invention.
Figure 4:
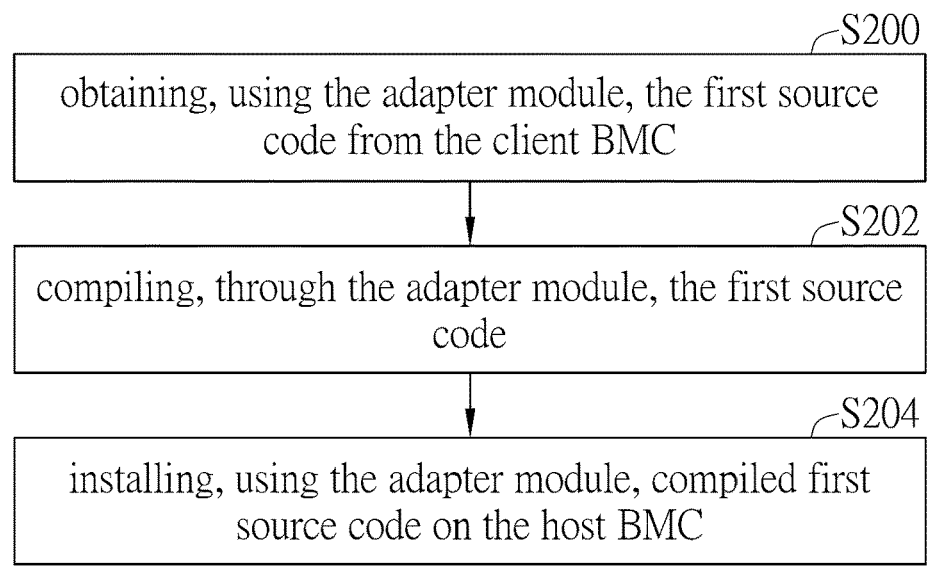
FIG. 4 is a flow chart illustrating migrating a function from a client BMC to a host BMC according to a method for generating a hybrid BMC system of the second embodiment of the present invention.

The second embodiment will be described below with reference to FIGS. 3-6. Referring to FIG. 3 and FIG. 4, the method for generating a hybrid BMC system further includes step S200: obtaining, using the adapter module 3, the first source code SC 1 from the client BMC 2; step S202: compiling, through the adapter module 3, the first source code SC1; and step S204: installing, using the adapter module 3, compiled first source code El on the host BMC 1.

Specifically, the second embodiment exemplifies the method of migrating the functionality of the client BMC 2 to the host BMC 1. In this embodiment, the first source code SC1 that is configured to perform the first task is fetched by the adapter module 3 and compiled using a toolchain TC1'. For example, the adapter module 3 includes a code for invoking a compiler in the toolchain TC'. The toolchain TC' can be from the host BMC 1 or the client BMC 2, the details of which will be discussed below. The adapter module 3 then installs the compiled first source code SC1 on the host BMC 1 such that the host 1 BMC can perform the first task.

Figure 5:
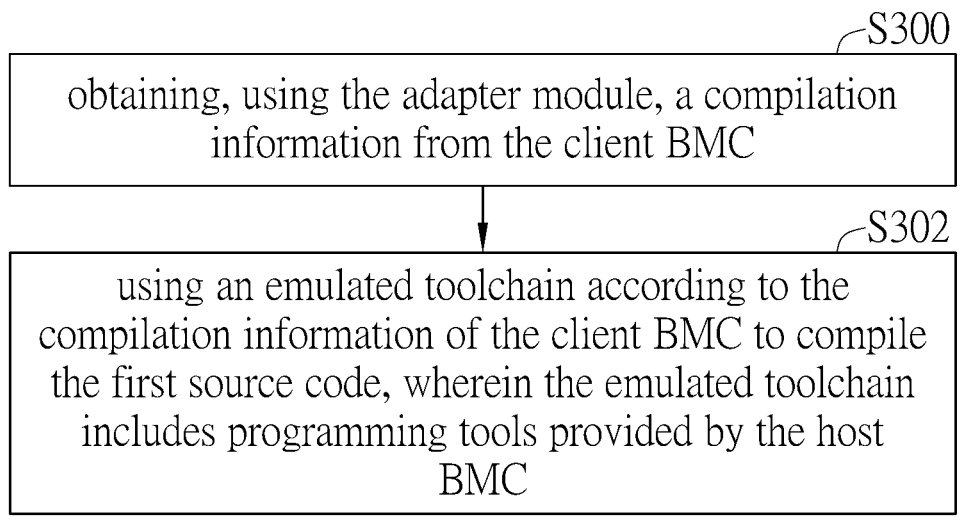
FIG. 5 is a flow chart illustrating an embodiment of compiling the first source code of the client BMC through the adapter module according to the method for generating a hybrid BMC system of the second embodiment of the present invention.

Moreover, referring to FIG. 5, in one embodiment, step S202 can include step S300: obtaining, using the adapter module 3, a compilation information I1 from the client BMC 2; and step S302: using an emulated toolchain TC' according to the compilation information of the client BMC 2 to compile the first source code SC1, wherein the emulated toolchain TC1' includes programming tools provided by the host BMC 1.

Specifically, where the first source code SC1 and the second source code SC2 are written in different programming languages, they need different toolchains to compile. In the present embodiment, the adapter module 3 obtained from the client BMC 2 the compilation information I1, which is associated with the compilation environment in which the first source code SC1 is compiled. For example, the compilation information I1 may be associated with the first toolchain TC1 used by the client BMC 2 to compile the first source code SC1. The adapter module 3 then generates, using programming tools from the host BMC 1, an emulated toolchain TC1' that emulates the first toolchain TC1. This way, the first source code SC1 can be compiled in the hybrid BMC system Z and thus the present embodiment achieves migrating functionality from one BMC to another, in which said two BMCs need different compilation environments.

Figure 6:
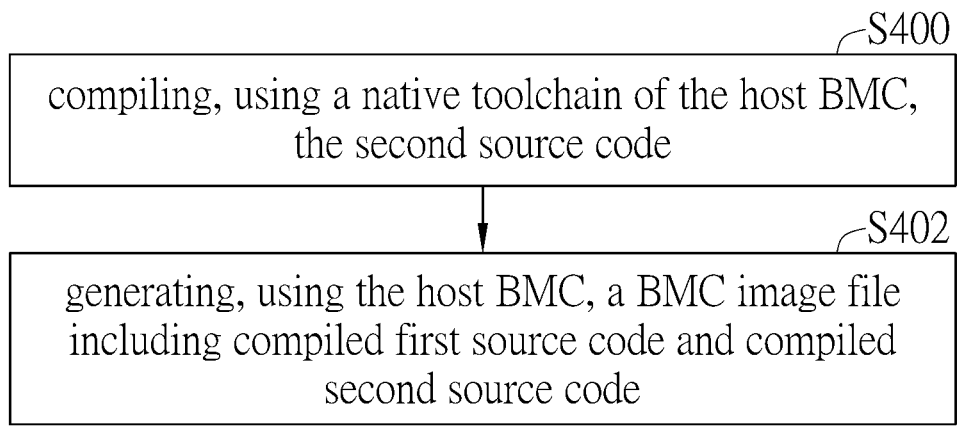
FIG. 6 is a flow chart illustrating an embodiment of the method for generating a hybrid BMC system of the second embodiment of the present invention.

With reference to FIG. 3 and FIG. 6, in one embodiment, the method for generating a hybrid BMC system of the present invention can further include step S400: compiling, using a native toolchain NTC of the host BMC 1, the second source code SC2; and step S402: generating, using the host BMC 1, a BMC image file 13 including compiled first source code E1 and compiled second source code E2. The BMC image file 13 can then be executed by the host BMC 1, or installed on another BMC chipset. With the technical solution described above, wherein the source code SC1 and the second source code SC2 are each compiled by its native compilation environment, either emulated by the adapter module 3 or native on the host BMC, the present embodiment achieves providing a hybrid BMC firmware image that includes functionalities from the host BMC 1 and the client BMC 2.

Third Embodiment

Figure 7:
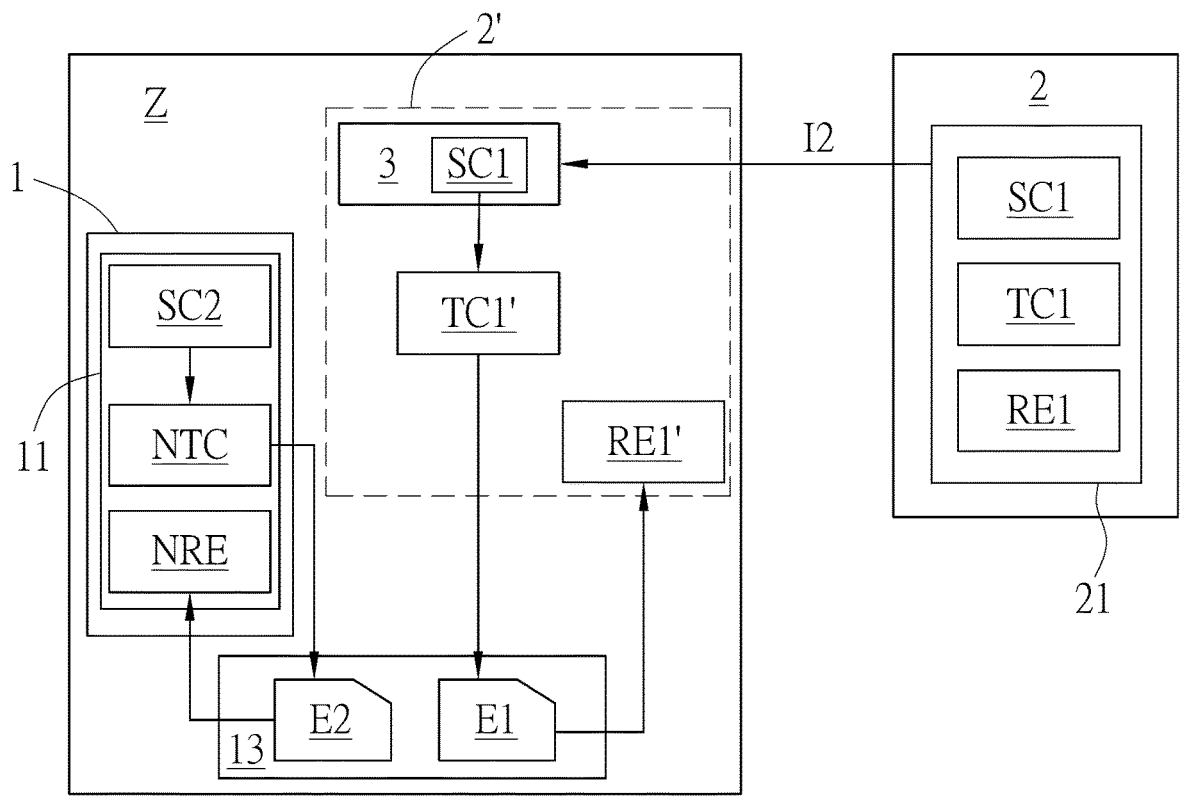
FIG. 7 is a functional block diagram illustrating the hybrid BMC system according to a third embodiment of the present invention.
Figure 8:
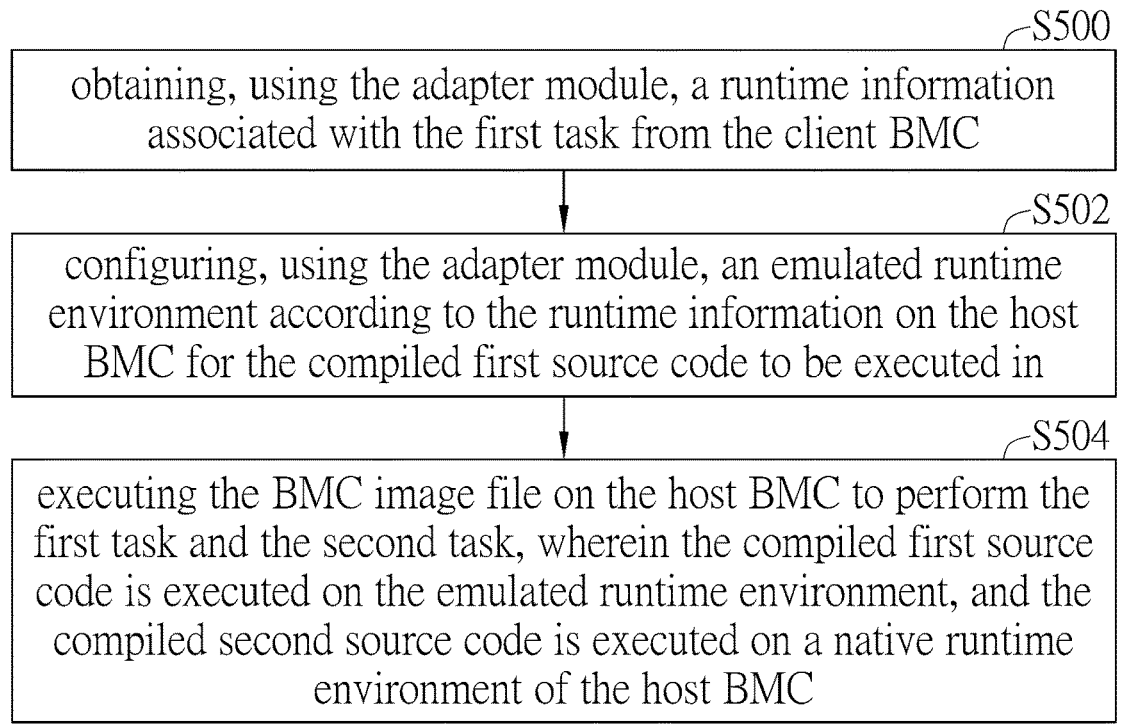
FIG. 8 is a flow chart illustrating the method for generating a hybrid BMC system of the second embodiment of the present invention.

Referring to FIG. 7 and FIG. 8, in one embodiment, the method for generating a hybrid BMC system of the present invention includes step S500: obtaining, using the adapter module 3, a runtime information I2 associated with the first task from the client BMC 2; step S502: configuring, using the adapter module 3, an emulated runtime environment RE1' according to the runtime information I2 on the host BMC 1 for the compiled first source code E1 to be executed in; and step S504: executing the BMC image file 13 on the host BMC 1 to perform the first task and the second task, wherein the compiled first source code E1 is executed on the emulated runtime environment RE 1', and the compiled second source code E2 is executed on the native runtime environment NRE of the host BMC 1.

Specifically, the runtime information I2 may include configuration file and libraries associated with the first source code SC1. In the present embodiment, the adapter module 3 generates an emulated runtime environment RE1' on the host BMC 1 by configuring parameters according to the configuration file and installing the libraries needed when the compiled first source code E1 is executed. The libraries associated with the first task may be provided by the host BMC 1 or obtained from the client BMC 2 by the adapter module 3; the present invention is not limited thereto. This way, the derived first source code SC1 in the hybrid BMC system Z, the emulated toolchain TC1' together with the emulated runtime environment RE 1' form an emulated first task module 2' that serves to perform the first task outside of the client BMC 2. The compiled first source code E1 and the compiled second source code E2 can then be executed on its runtime environment respectively, either emulated or native on the host BMC 1. With the technical solution described above, the hybrid BMC system Z provided by the present embodiment achieves integrating the functionality of the client BMC 2 into the host BMC 1 during both the compile time and the run time.

The descriptions illustrated supra set forth simply the embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A method for generating a hybrid BMC (baseboard management controller) system, which includes a plurality of BMCs with source code, a toolchain, emulated and native runtime environment, the method comprising:
   selecting, among a plurality of BMCs, one BMC to be a host BMC;
   selecting, among the plurality of BMCs, another BMC to be a client BMC includes a first source code, wherein the client BMC uses a first communication protocol different from a second communication protocol used by the host BMC, the client BMC being configured to perform a first task, and the host BMC includes a second source code being configured to perform a second task different from the first task;
   configuring an adapter module of the host BMC to interface with the client BMC through the first communication protocol and interface with the host BMC through a second communication protocol such that the host BMC performs the first task through the adapter module to provide a hybrid BMC firmware image that includes functionalities from the host BMC and the client BMC;
   compiling, using a native toolchain of the host BMC, the second source code;
   generating, using the host BMC, a BMC image file including compiled first source code and compiled second source code; and
   executing the BMC image file on the host BMC to perform the first task and the second task, wherein the compiled first source code is executed on the emulated runtime environment and the compiled second source code is executed on a native runtime environment of the host BMC.

2. The method according to claim 1, wherein the client BMC includes a first source code configured to perform the first task, and the host BMC includes a second source code configured to perform the second task, the method further comprising:
   obtaining, using the adapter module, the first source code from the client BMC;
   compiling, through the adapter module, the first source code; and
   installing, using the adapter module, compiled first source code on the host BMC.

3. The method according to claim 2, wherein the step of compiling the first source code comprises:
   obtaining, using the adapter module, a compilation information from the client BMC; and
   compiling the first source code using an emulated toolchain according to the compilation information of the client BMC, wherein the emulated toolchain includes programming tools provided by the host BMC.

4. The method according to claim 2, further comprising:
   compiling the second source code using a native toolchain of the host BMC; and generating, using the host BMC, a BMC image file including compiled first source code and compiled second source code.

5. The method according to claim 2, further comprising:
obtaining, using the adapter module, a runtime information associated with the first task from the client BMC; and
configuring, using the adapter module, an emulated runtime environment on the host BMC according to the runtime information, wherein the emulated runtime environment is for the compiled first source code to be executed in.

6. The method according to claim 5, further comprising:
compiling, using a native toolchain of the host BMC, the second source code;
generating, using the host BMC, a BMC image file including compiled first source code and compiled second source code; and
executing the BMC image file on the host BMC to perform the first task and the second task, wherein the compiled first source code is executed on the emulated runtime environment, and the compiled second source code is executed on a native runtime environment of the host BMC.

7. A hybrid baseboard management controller (BMC) system, comprising:
a plurality of BMCs with source code, wherein
among a plurality of BMCs, one BMC is selected to be a host BMC, and
among the plurality of BMCs, another BMC is selected to be a client BMC includes a first source code;
a toolchain, emulated and native runtime environment;
a host BMC, including a second source code configured to perform a second task, wherein the client BMC uses a first communication protocol different from a second communication protocol used by the host BMC, the client BMC being configured to perform a first task; and
an adapter module of the host BMC, including a first source code of a client BMC configured to perform a first task, wherein the adapter module interfaces with the client BMC through a first communication protocol and interfaces with the host BMC through a second communication protocol such that the host BMC performs the first task through the adapter to provide a hybrid BMC firmware image that includes functionalities from the host BMC and the client BMC;
wherein the second source code is compiled using a native toolchain of the host BMC;
wherein a BMC image file including compiled first source code and compiled second source code is generated using the host BMC; and
wherein the BMC image file is executed on the host BMC to perform the first task and the second task, wherein the compiled first source code is executed on the emulated runtime environment, and the compiled second source code is executed on a native runtime environment of the host BMC.

8. The hybrid BMC system according to claim 7, wherein the adapter module compiles the first source code using an emulated toolchain according to a compilation information obtained from the client BMC, the emulated toolchain including programming tools of the host BMC.

9. The hybrid BMC system according to claim 8, further comprising an emulated runtime environment for the compiled first source code to be executed in, the emulated runtime environment being configured by the adapter module according to a runtime information associated with the first task obtained from the client BMC.

10. The hybrid BMC system according to claim 8, further comprising a BMC image file including compiled first source code and compiled second source code, wherein the compiled second source code is compiled by a native toolchain of the host BMC.

* * * * *